United States Patent Office 3,778,293
Patented Dec. 11, 1973

3,778,293
METHOD OF MAKING REGENERATIVE HEAT-EXCHANGER SEALS
Calvin Eric Silverstone, Alcester, England, assignor to British Leyland Truck and Bus Division Limited, Leyland, Lancashire, England
Filed July 17, 1972, Ser. No. 272,398
Claims priority, application Great Britain, Sept. 30, 1971, 45,513/71
Int. Cl. B05b 5/06; F28d 19/00
U.S. Cl. 117—93.1 PF          4 Claims

ABSTRACT OF THE DISCLOSURE

A method of manufacturing a counterface cold-side seal for a rotary disc-type matrix of a regenerative heat-exchanger comprises: forming a mixture of a temperature-resistant polymer and a solid lubricant, and depositing this mixture onto a counterface support pad of the seal by means of flame or plasma spraying.

---

This invention relates to seals for regenerative heat-exchangers of the kind employing a rotary disc-type matrix.

Regenerative heat-exchangers of the kind referred to are usually incorporated in gas turbine power plants to extract heat from the exhaust gases, and to transfer it to the compressed intake-air before this enters the combustion chamber of the gas turbine engine. The rotary disc-type matrix, which is housed in the casing of the engine, normally comprises a foraminous refractory core of ceramic or glass-ceramic material formed with a multitude of fluid-flow ducts. Sector-like zones of the core are caused (by its rotation) to be presented alternately to the flow of the exhaust gases and to the flow of the compressed intake-air. In that way the required heat transference is effected.

It is, of course, necessary to segregate the two gaseous flows at all times, and to minimize leakage between the high-pressure zones, occupied by the compressed intake-air, and the low-pressure zones occupied by the exhaust gases. The air and exhaust gas flow through the heat-exchanger disc in opposite directions such that the cold air enters the disc adjacent to the exit of the cooled exhaust gas. This face of the disc, embracing both air entry and gas exit sectors, is commonly designated the "cold side." Similarly, the hot exhaust gas enters the disc adjacent to the exit of the heated air. This face of the disc, embracing both gas entry and air exit sectors, is commonly designated the "hot side."

To effect segregation of the air and exhaust gas, it is common practice to employ counterface seals that make rubbing contact with the respective faces of the matrix, the hot-side seals being of high-temperature material.

The counterface material employed for the cold-side seals of ceramic regenerative heat-exchangers is commonly graphite, formed as blocks which are stuck onto a counterface support pad of the seal with a silicone rubber solution.

According to this invention an improved method of manufacturing a counterface cold-side seal for a rotary disc-type matrix of a regenerative heat-exchanger comprises: forming a mixture of a temperature-resistant polymer and a solid lubricant, and depositing this mixture onto a counterface support pad of the seal by means of flame or plasma spraying. The counterface seal thus produced has a low wear-rate together with a low coefficient of friction. A suitable temperature-resistant polymer is an aromatic polyester, such as that identified by the trademark "Ekonol" (and which is manufactured by the Carborundum Company).

Suitable solid lubricants include P.T.F.E. (polytetrafluoroethylene), F.E.P. (fluorinate ethylene propylene), graphite, talc and calcium fluoride. The quantity of solid lubricant may be up to 10% of that of the temperature-resistant polymer.

Referring to the accompanying schematic drawings.

Figure 2:
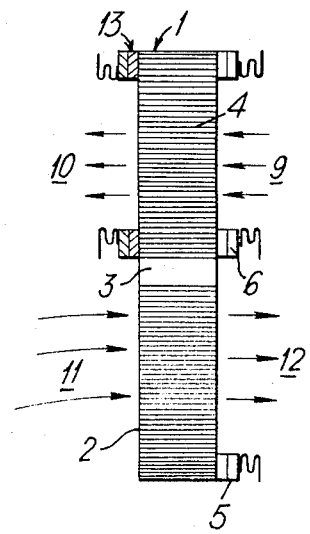
FIG. 2 is a section on the line II—II in FIG. 1.

A regenerative heat-exchanger 1 has a rotary disc-type matrix 2 mounted on a central bearing 3. The matrix 2, which is housed in a casing (not shown) of a gas turbine engine, comprises a foraminous annular refractory core of ceramic or glass-ceramic material formed with a multitude of fluid-flow ducts 4 (FIG. 2) that lie substantially parallel to the axis of rotation.

Figure 1:
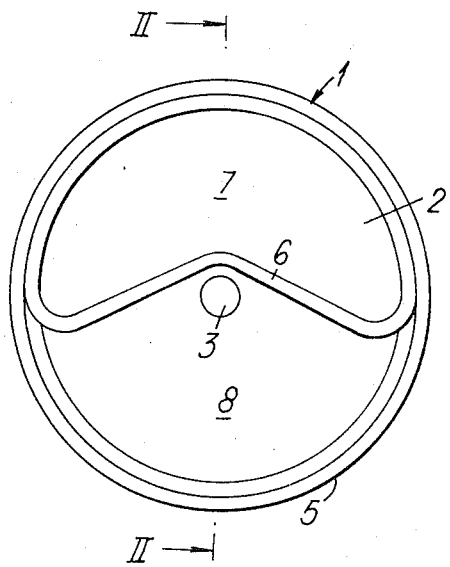
FIG. 1 is an axial view of a rotary disc-type matrix of a regenerative heat-exchanger having a counterface cold-side seal manufactured by the method according to the invention.

By means of confluent outer and inner seals 5 and 6 respectively, sector-like zones 7 and 8 (FIG. 1) of the matrix 2 are caused (by its rotation) to be presented alternately to the flow of hot exhaust gas and to the flow of the compressed intake-air. The hot exhaust gas enters the matrix 2 at zone 9 (FIG. 2), and the cooled exhaust gas leaves the matrix at zone 10. The compressed intake-air enters the matrix 2 at zone 11, and leaves it at zone 12 after having been heated to a high temperature. Zones 9 and 12 constitute the hot side of the matrix 2, and zones 10 and 11 constitute its cold side. Zone 10 is bounded by a counterface seal 13 that conforms to the shape of the sector-like zone 7 (FIG. 1).

Figure 3:
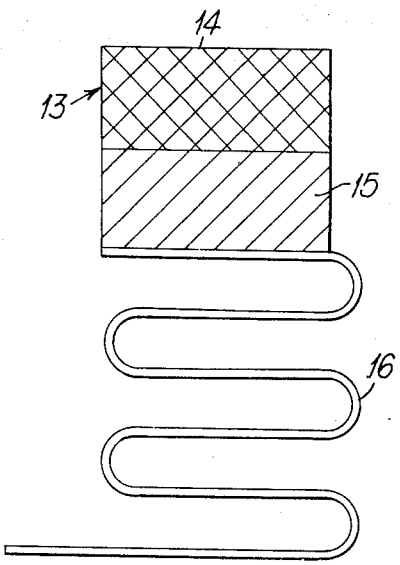
FIG. 3 is an enlarged cross-sectional view of the cold-side seal.

Referring to FIG. 3, the cold-side seal 13 includes a counterface 14 and, in accordance with the invention, is manufactured by forming a mixture of a temperature-resistant polymer and a solid lubricant, and depositing this mixture onto a support pad 15 by means of flame or plasma spraying. The support pad 15 is attached to a metal bellows 16 mounted on the engine casing.

As indicated earlier, an appropriate temperature-resistant polymer for the present purpose is the aromatic polyester known by the trademark "Ekonol"; and appropriate solid lubricants include P.T.F.E. (polytetrafluoroethylene), F.E.P. (fluorinate ethylene propylene), graphite, talc and calcium fluoride. The quantity of solid lubricant may be up to 10% of that of the temperature-resistant polymer.

I claim:

1. A method of manufacturing a counterface cold-side seal for a rotary disc-type matrix of a regenerative heat-exchanger; which comprises: forming a mixture of a temperature-resistant polymer and a solid lubricant, and depositing this mixture onto a counterface support pad of the seal by means of flame or plasma spraying.

2. A method according to claim 1, in which the quantity of the solid lubricant is up to 10% of that of the temperature-resistant polymer.

3. A method according to claim 1, in which the temperature-resistant polymer is an aromatic polyester.

4. A method according to claim 1, in which the solid lubricant is selected from the group consisting of polytetrafluoroethylene, fluorinate ethylene propylene, graphite, talc, calcium fluoride.

References Cited

UNITED STATES PATENTS

| 3,449,145 | 6/1969 | Bloom et al. | 117—21 |
| 3,646,993 | 3/1972 | Rice et al. | 165—9 |
| 3,679,459 | 7/1972 | Rao et al. | 117—93.1 PFX |
| 3,723,165 | 3/1973 | Longo et al. | 117—93.1 PF |

ALBERT W. DAVIS, JR., Primary Examiner

U.S. Cl. X.R.

117—105.2; 165—9; 277—95 R, 235 A